United States Patent [19]

Ravela et al.

[11] Patent Number: 5,987,456
[45] Date of Patent: Nov. 16, 1999

[54] IMAGE RETRIEVAL BY SYNTACTIC CHARACTERIZATION OF APPEARANCE

[75] Inventors: Srinivas Ravela, Amherst; Raghavan Manmatha, Northampton; Edward Riseman, Leeds, all of Mass.

[73] Assignee: University of Masschusetts, Boston, Mass.

[21] Appl. No.: 08/959,500

[22] Filed: Oct. 28, 1997

[51] Int. Cl.[6] .................................................. G06F 17/30
[52] U.S. Cl. ................................................. 707/5; 707/4
[58] Field of Search ................... 707/5, 104, 4; 345/326

[56] References Cited

U.S. PATENT DOCUMENTS

| | | | |
|---|---|---|---|
| 5,274,714 | 12/1993 | Hutcheson et al. | 382/15 |
| 5,579,471 | 11/1996 | Barber et al. | 345/326 |
| 5,692,012 | 11/1997 | Virtamo et al. | 375/240 |
| 5,819,288 | 10/1998 | De Bonet | 707/104 |

OTHER PUBLICATIONS

Ravela et al., "Image Retrieval Using Scale–Space Matching," *ECCV 96*, pp. 273–282, Apr. 1996.
Schmid et al., "Combining greyvalue invariants with local constraints for object recognition," *IEEE, Proc. Computer Vision and Pattern Recognition*, pp. 872–877, (Jun. 1996).

Primary Examiner—Wayne Amsbury
Assistant Examiner—Cheryl Lewis
Attorney, Agent, or Firm—Fish & Richardson P.C.

[57] ABSTRACT

An image retrieval method which includes producing multiscale vectors associated with points in a set of database images, indexing the database vectors to produce a database vector index, producing query multiscale vectors associated with points in a query image, and matching the query vectors with the indexed database vectors to identify a database image which is similar to the query image. Each of the database multiscale vectors and the query multiscale vectors includes multiple single scale vectors associated with corresponding spatial scales. The method can include applying a single scale image processing procedure at each of the spatial scales to produce single scale vectors and combining single scale vectors each associate with a given point in an image to form a multiscale vector associated with that point. The single scale image processing procedure can include evaluating multiple smoothed spatial derivatives of image intensity at a point in an image and transforming the spatial derivatives to produce a single scale vector which is insensitive to rotation of the image about the point.

24 Claims, 12 Drawing Sheets

IMAGE RETRIEVAL BY SYNTACTIC CHARACTERIZATION OF APPEARANCE

STATEMENT AS TO FEDERALLY SPONSORED RESEARCH

This invention was made with U.S. Government support under the following agreements: National Science Foundation, Library of Congress and Department of Commerce under cooperative agreement number EEC-9209623; United States Patent and Trademark Office and Defense Advanced Research Projects Agency/ITO under ARPA order number D468, issued by ESC/AXS contract number F19628-95-C-0235; National Science Foundation under grant number IRI-9619117; and NSF Multimedia CDA-9502639. The Government may have certain rights in the invention.

BACKGROUND

The advent of large multi-media collections and digital libraries has led to a need for good search tools to index and retrieve information from them. For text available in machine readable form a number of good search tools are available. However, there are as yet no adequate tools to index and retrieve images. A traditional approach to searching and indexing images uses manual textual annotations, but this approach is slow, labor intensive and expensive. In addition, textual annotations cannot encode all the information available in an image. There is thus a need for retrieving images using their content directly.

A person using an image retrieval system may seek to find semantic information. For example, a person may be looking for a picture of a leopard from a certain viewpoint. Or alternatively, the user may require a picture of Abraham Lincoln. Identifying semantic information in images required for these types of queries is difficult. For example, automatic indexing for semantic retrieval typically includes, among other steps, automatic segmentation of an image into objects, which in itself is difficult.

Other approaches to image retrieval have tried to characterize the appearance of an object using a transformation of the intensity at points in an image. In one approach, an image is treated as a fixed-length vector of its pixel values. A reduced-dimension vector is then computed by projecting the vector of an image onto eigenvectors corresponding to the largest eigenvalues (principal component dimensions) computed from vectors of a set of database images. A reduced-dimension vector is computed for a query image and for each of the database images. Database images with similar (for example, close in Euclidean distance) vectors to that of the query image are returned. For this approach to be successful, all the images should be normalized to reduce variation in geometry and intensity, as well as be consistently segmented. In addition, the eigenvectors must in general be computed separately for different types of images, for example, eigenvectors computed for images of faces may not be useful for retrieving images of automobiles.

SUMMARY

In one aspect, in general, the invention provides a method of image retrieval which includes applying a database multiscale image processing procedure to each of a set of database images to produce multiscale vectors associated with points in the database images, indexing the database vectors to produce a database vector index, applying a query multiscale image processing procedure to a query image to produce query multiscale vectors associated with points in the query image, and matching the query vectors with the indexed database vectors to identify a database image which is similar to the query image. Each of the database multiscale vectors and the query multiscale vectors includes multiple single scale vectors associated with corresponding database spatial scales.

Other embodiments of the invention can include one or more of the following features. The method can include applying a single scale image processing procedure at each of the database spatial scales to produce single scale vectors and combining single scale vectors each associate with a given point in an image to form a multiscale vector associated with that point in that image. The single scale image processing procedure can include evaluating multiple smoothed spatial derivatives of image intensity at a point in an image and transforming the spatial derivatives to produce a single scale vector associated with the point such that the single scale vector is insensitive to rotation of the image about the point. Evaluating smoothed spatial derivatives of an image intensity can include filtering the image using a derivative of a Gaussian function. The method can also include accepting a specification of a salient region of the query image and selecting the query points within the salient region. Matching can include comparing relative location of points associated with query vectors with relative locations of points associated with database vectors. Query vectors can also include single scale vectors associated with corresponding additional spatial scales, and matching can includes selecting a subset of the single scale vectors associated with particular spatial scales in each of the query vectors. Matching can also include accessing the database vector index to find database vectors that have similar values to one of the query vectors.

In another aspect, in general, the invention provides a computer program stored on a computer readable medium for causing a computer to perform the functions of applying a database multiscale image processing procedure to each of multiple database images producing multiple database multiscale vectors associated with points in the images, indexing the database vectors to produce a database vector index, applying a query multiscale image processing procedure to a query image to produce multiple query multiscale vectors associated with points in the query image, and matching the query vectors with the indexed database vectors to identify a database image which is similar to the query image.

Advantages of the invention include that the database vector index can be computed prior to accepting a query image. Use of the database vector index then increases retrieval speed considerably. The invention also provides a method of finding similar images that are rotated relative to a query image, or that are scaled relative to the query image. The use of multiple spatial scales provides accurate image retrieval of images similar to a query image.

DESCRIPTION

Figure 1:
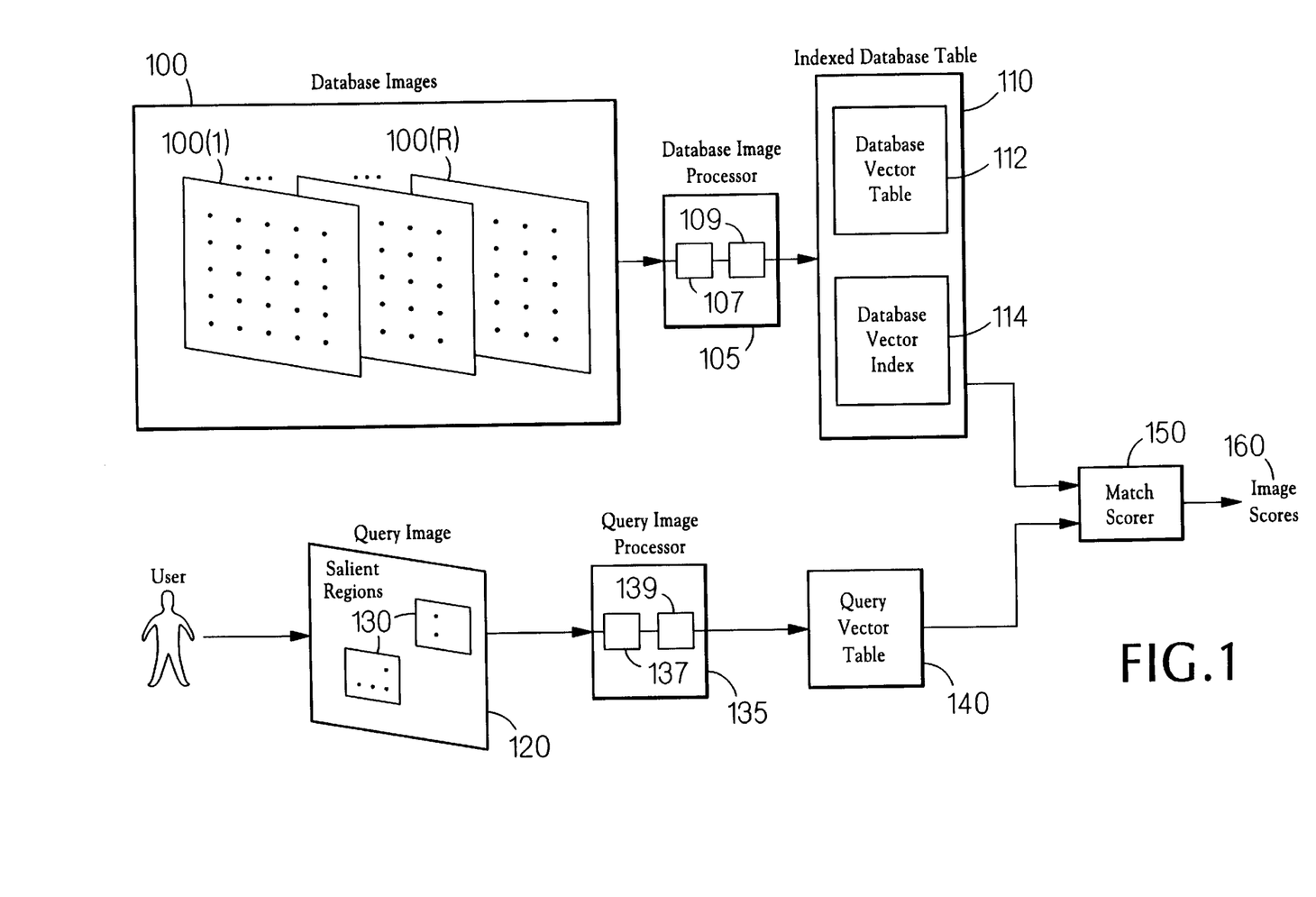
FIG. 1 illustrates an image indexing and retrieval procedure.

A first embodiment of the invention addresses the problem of searching and sorting a set of database images by their similarity to a user query. There are three basic steps to the approach, as illustrated in FIG. 1:

1. Database image processor 105 processes a set of N stored database images 100 by selecting a subset of points in each database image, computing multiscale vector representations of the database images at those points, and filling a database vector table 112 in a indexed database table 110 with the results. In addition, the database image processor computes a database vector index 114, also stored in the indexed database table, for accessing the indexed database table.

2. A user selects a query image 120 and one or more salient regions 130 in the query image. For example, the user may have an image containing an object of interest and he manually (e.g., using a cursor on a computer screen) indicates the portion of the image containing the object of interest. A query image processor 135 processes the query image by selecting a subset of points within the salient regions, computing multiscale vector representations of the query image at those points, and filling query vector table 140 with the results.

3. A match scorer 150 compares the data in query vector table 140 against the indexed set of database vector representations in indexed database table 110 to determine image scores 160 for the database images relative to the query. Database images can then be presented to the user sorted by their image scores.

Step 1 is performed off-line prior to the user's forming the query. By using the database vector index 114 to the data in database vector table 112, match scorer 150 determine scores for the database images more efficiently than considering each database image in turn.

In step 2, rather than attempting to match all points in a query image to points in database images, the user manually selects one or more salient regions within a query image. Within these regions, the query image processor automatically selects the set of points used. By allowing the user to select the salient regions, there is no need for an automated algorithm to detect salient feature or regions in the query image. In addition, based or the results of a search, the user can quickly adapt and modify the query to refine the search.

In step 3, match scorer 150 compares not only the vector representations computed at points in the query image to those computed at points in database images, but also compares the geometric relationship of points to each other in the query and the geometric relationship of corresponding points in a database image. This "spatial fittig" procedure improves retrieval of appropriate images. Furthermore, the spatial fitting procedure does not require that the orientation be matched in the query and in a database image, thereby enabling retrieval of database images in which a desired object is rotated relative to the query image.

Database image processor 105 and query image processor 135 select points in inputs images in database point selector 107 and query point selector 137 respectively. Feature computers 109 and 139 respectively compute multiscale vector features at the selected points. Each of feature computers 109 and 137 implements invariant multiscale feature computation 210 shown in FIG. 2.

Figure 2:
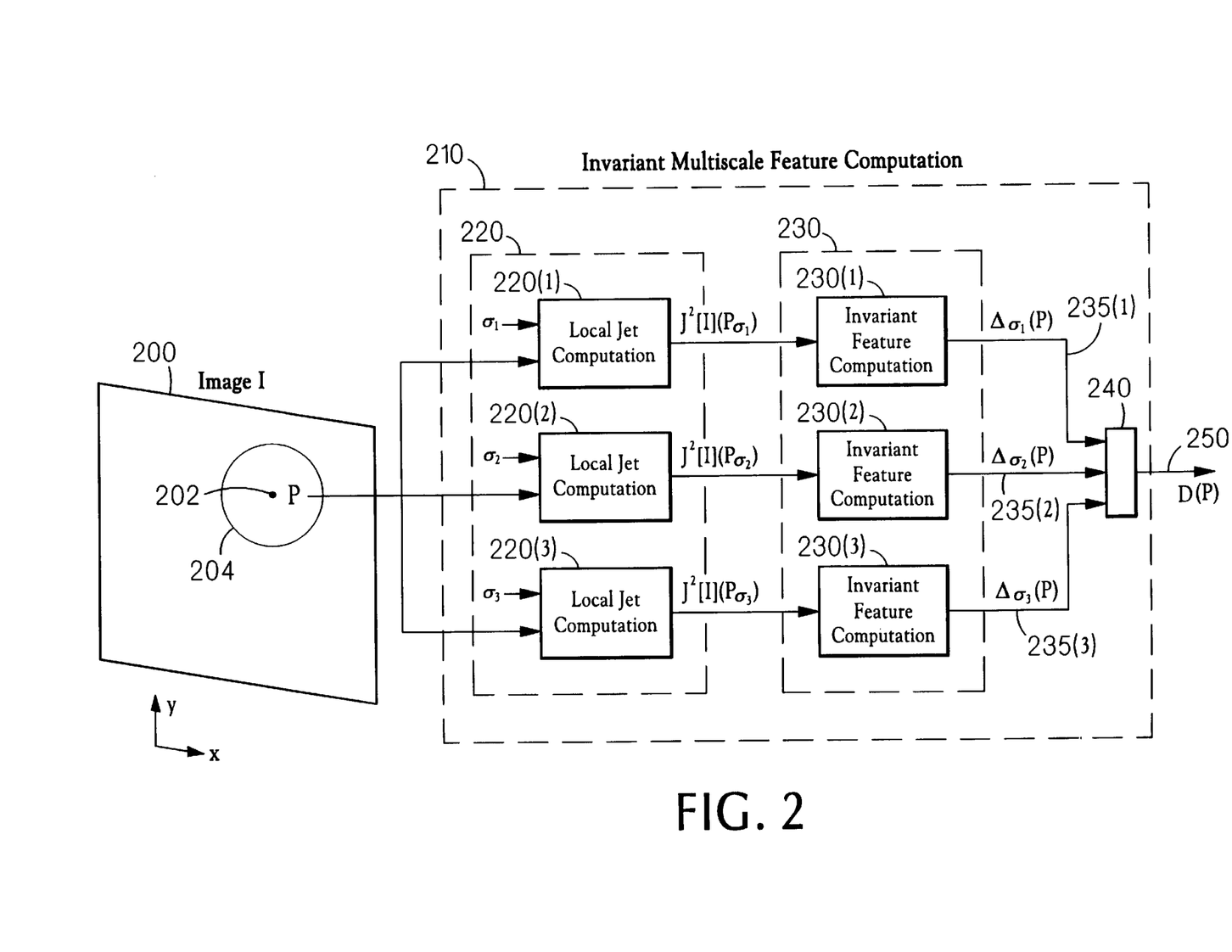
FIG. 2 illustrates a procedure for computing invariant features at a point of an image.

Invariant multiscale feature computation 210, shown in FIG. 2, is used to implement feature computation elements 109 and 139 shown in FIG. 1. In FIG. 2, invariant multiscale feature computation 210 is used to compute an invariant multiscale feature vector 250 at a point p 202 of an input image I 200. Feature computation 210 involves of two stages: local jet computation 220 followed by invariant feature computation 230. Local jet computation 220 computes Gaussian-smoothed spatial derivatives of image 200 at point 202, based on the image in a neighborhood 204 around the point. In this embodiment, local jet computation is performed at three different spatial scales, indicated as 220(1)–220(3), each spatial scale corresponding to a different degree of spatial smoothing, parameterized by a scale parameter σ taking values σ1, σ2, and σ3. The values of σ1, σ2, and σ3 are chosen such that $\sigma 2 = \sigma 1 \sqrt{2}$ and $\sigma 3 = \sigma 2 \sqrt{2}$. The scale parameter σ corresponds to the standard deviation of the Gaussian distribution used to compute the Gaussian smoothed derivatives that make up the local jet. A local jet of order two, for an image I, computed with scale parameter σ, and evaluated at a point p is denoted $J^2[I](p;\sigma)$. The jet is made up of the zeroth, first, and second order smoothed spatial derivatives of I at p: $I_\sigma(p)$, $I_{x;\sigma}(p)$, $I_{y;\sigma}(p)$, $I_{xx;\sigma}(p)$, $I_{yy;\sigma}(p)$, and $I_{xy;\sigma}(p)$. $I_\sigma(p)$ is a Gaussian smoothed image at point p; $I_{x;\sigma}(p)$ is the smoothed spatial first derivative in the x coordinate direction at point p; $I_{xx;\sigma}(p)$ is the second derivative in the x direction; $I_{y;\sigma}(p)$ and $I_{yy;\sigma}(p)$ are corresponding derivatives in the y direction; and $I_{xy;\sigma}(p)$ is the derivative in both the x and the y directions. In general, a local jet of order n includes the terms necessary to form the Taylor series of order n of the image intensity around the point. Use of a local jet limited to order two and computation of the associated invariant features provides increased robustness and better search characteristics over using a higher order local jet with an associated higher dimension feature vector.

The output values from local jet computation 220 are then transformed by an invariant feature computation stage 230. At each scale, feature computation stage 230 transforms the local jet to produce an irreducible set of rotationally invariant features. An invariant term corresponding to intensity is not computed and the remaining outputs, $\Delta_{\sigma 1}(p)$, $\Delta_{\sigma 2}(p)$, and $\Delta_{\sigma 3}(p)$ 235(1)–235(3), of invariant feature computations 230(1)–230(3) at the three spatial scales are passed to concatenator 240. Concatenator 240 concatenates the feature vectors computed at each scale to form invariant multiscale feature vector 250.

Figure 3:
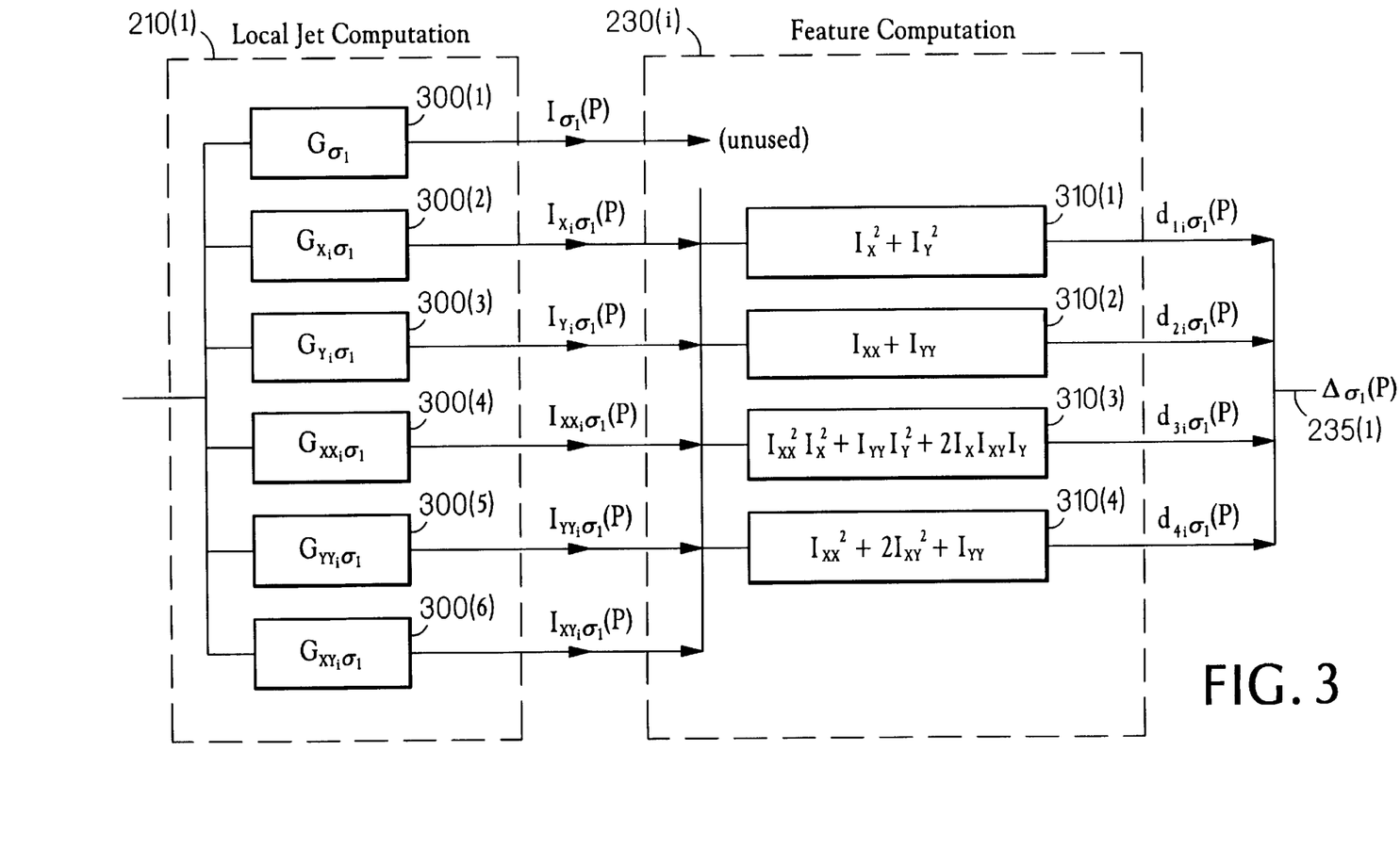
FIG. 3 illustrates detailed computation of invariant features.

FIG. 3 shows the detail of the two-stage computation of an invariant feature vector at a single scale, σ=σ1. The computation of the invariant feature at other scales is identical except for the use of different values of σ. The first stage of computation of an invariant feature at scale σ=σ1 is local jet computation 220(1). The outputs of local jet computation 220(1) are the inputs to the second feature computation stage 230(1).

Referring to FIG. 2, local jet computation 220(1) involves computing Gaussian smoothed spatial derivatives at a point p 202 based on a neighborhood 204 in image 200 around the point. Referring again to FIG. 3, local jet computation 220(1) includes evaluating the result of filtering of the image with zeroth, first and second order spatial derivatives of a Gaussian with variance σ1 centered at point p, indicated as Gaussian derivative filters 300(1)–300(6). Specifically, the components of the local jet $J^2[I](p;\sigma)$ are defined by the convolutions:

$I_\sigma = I * G_\sigma$
$I_{x;\sigma} = I * G_{x;\sigma}$
$I_{xx;\sigma} = I * G_{xx;\sigma}$
$I_{y;\sigma} = I * G_{y;\sigma}$
$I_{yy;\sigma} = I * G_{yy;\sigma}$
$I_{xy;\sigma} = I * G_{xy;\sigma}$ where $G_\sigma(r) = (2\Pi\sigma^2)^{-1} \exp(-\|r\|^2/2\sigma^2)$ and $r=(x,y)$ where x and y are orthogonal coordinate components of r and $\|r\|$ is the magnitude of r. The spatial derivative $G_{x;\sigma}(r)$ $G_{xx;\sigma}(r)$, $G_{y;\sigma}(r)$, $G_{yy;\sigma}(r)$, and $G_{xy;\sigma}(r)$, are derived from $G_\sigma(r)$ by taking the appropriate derivatives with respect to x or y components of r.

Note that local jet computation 210(1) filters an image with spatial derivatives of the smoothing Gaussian distribution, rather than first computing the spatial derivatives of the image and then filtered the derivative with the smoothing Gaussian distribution.

Gaussian derivative filters 300(1)–300(6) evaluate the convolutions as finite sums. For instance, filter 300(1) implements $I_\sigma(p) = \Sigma_r I(p-r) G_\sigma(r)$ for image points (p-r). The sum is restricted to values of r such that $\|r\| < 4\sigma$. The computations in filters 300(2)–300(6) are computed similarly with $G_\sigma(r)$ replace by $G_{x;\sigma}(r)$, $G_{y;\sigma}(r)$, $G_{xx;\sigma}(r)$, $G_{yy;\sigma}(r)$ and $G_{xy;\sigma}(r)$ respectively. Note that these computations are local and are therefore not sensitive to the absolute coordinates of a point. The features are therefore invariant under rigid translation of the image.

The outputs of the Gaussian derivative filters 300(1)–300 (6) at point p are the inputs to feature computation stage 230(1). This stage computes an irreducible set of features that are non-linear functions of the Gaussian derivatives. The feature computations 310(1)–310(4) are such that, in conjunction with the characteristics of local jet computation 210(1), the resulting features 312(1)–312(4) are invariant under rotation of the image around point p, in addition to being invariant under translation of the image. In addition, the features 312(1)–312(4) are irreducible in that none can be identically computed as a function of the others. A set of irreducible invariant features for Gaussian derivatives up to order two are the following:

$d_{0;\sigma} = I_{x;\sigma}$
$d_{1;\sigma} = I_{x;\sigma}^2 + I_{y;\sigma}^2$;
$d_{2;\sigma} = I_{xx;\sigma} + I_{yy;\sigma}$;
$d_{3;\sigma} = I_{xx;\sigma}I_{x;\sigma}^2 + I_{yy;\sigma}I_{y;\sigma}^2 + 2I_{x;\sigma}I_{xy;\sigma}I_{y;\sigma}$; and
$d_{4;\sigma} = I_{xx;\sigma}^2 + 2I_{xy;\sigma}^2 + I_{yy;\sigma}^2$.

Irreducible invariant feature vector $\Delta_{\sigma 1}(p)$ 235(1) is composed of features $d_{1;\sigma 1}$ through $d_{4;\sigma 1}$. The invariant feature $d_{0;\sigma 1}$ corresponding to the smoothed image is not computed or used. Referring back to FIG. 2, the vectors $\Delta_{\sigma 1}(P)$, $\Delta_{\sigma 2}(P)$, and $\Delta_{\sigma 3}(p)$ are passed to concatenator 240 to form the 12 element multiscale feature vector D(p) 250.

Figure 4:
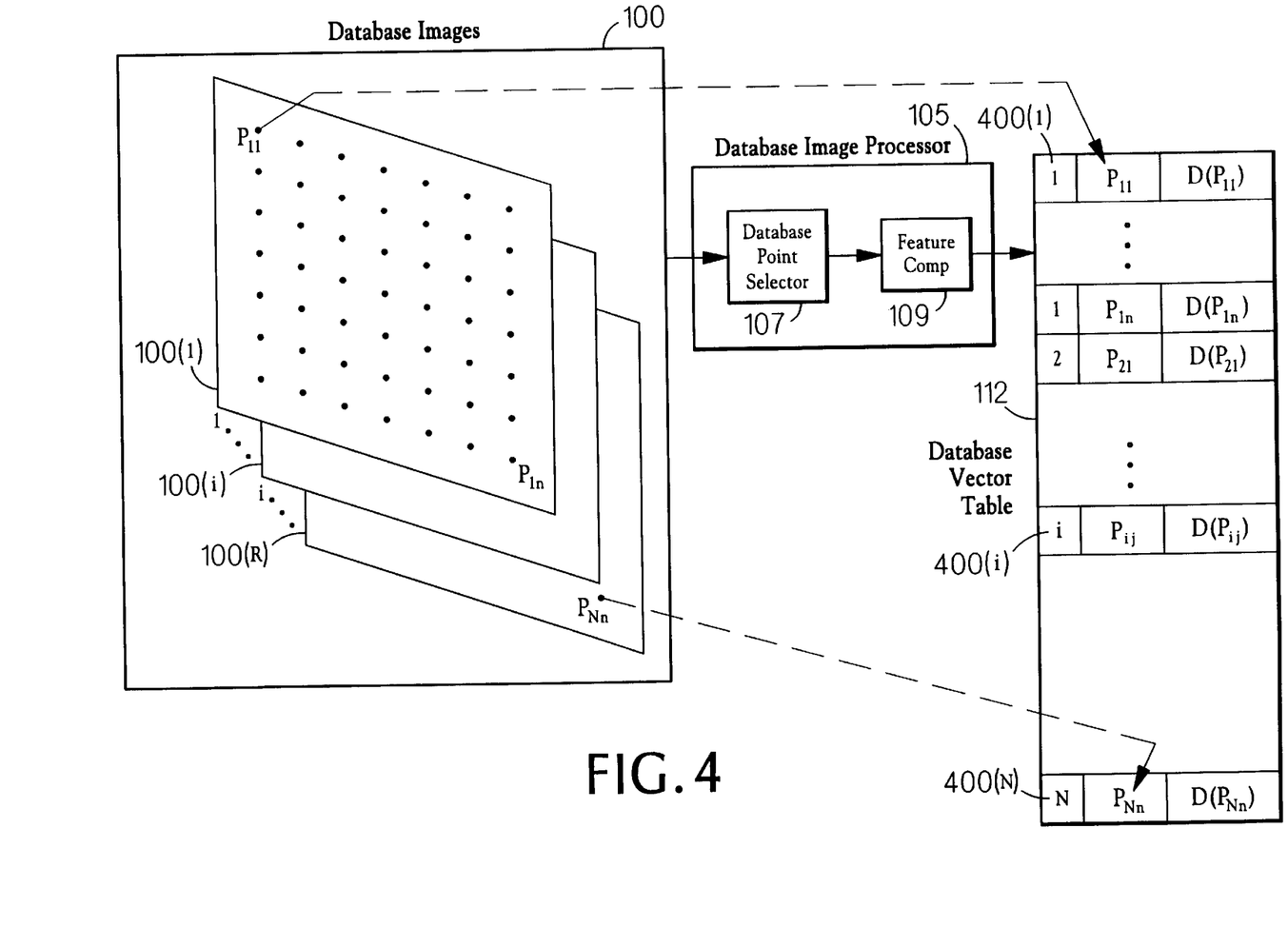
FIG. 4 illustrates a procedure for constructing a database vector table from a set of database images.

FIG. 4 shows database image processor 105 used to fill database vector table 112 with invariant multiscale feature vectors for sampled points in database images 100(1)–100 (R). In each image, database point selector 107 selects a regular grid of points independently of the content of the image. In this embodiment, the grid is rectangular, and the spacing may depend on the size of the image. For example, for an image of size 240×320, spacing of up to 5 pixels is used. Database vector table 112 has rows 400(1)–400(N), one for each point in each database image. A row 400(1) corresponds to a point $p_{11}$ in database image 100(1) and has three fields. The first indicates the image number, in this case 1; the second has the x and y coordinates of the point $p_{11}$; and the third has the 12 values in the multiscale invariant feature vector at that point, computed in feature computation 109 using the procedure in multiscale invariant feature computation 210. The data in database vector table 112 is a complete representation of database images 100 for the purpose of indexing and scoring images relative to a user query; database images 100 are not accessed in further stages of indexing or scoring.

Figure 5:
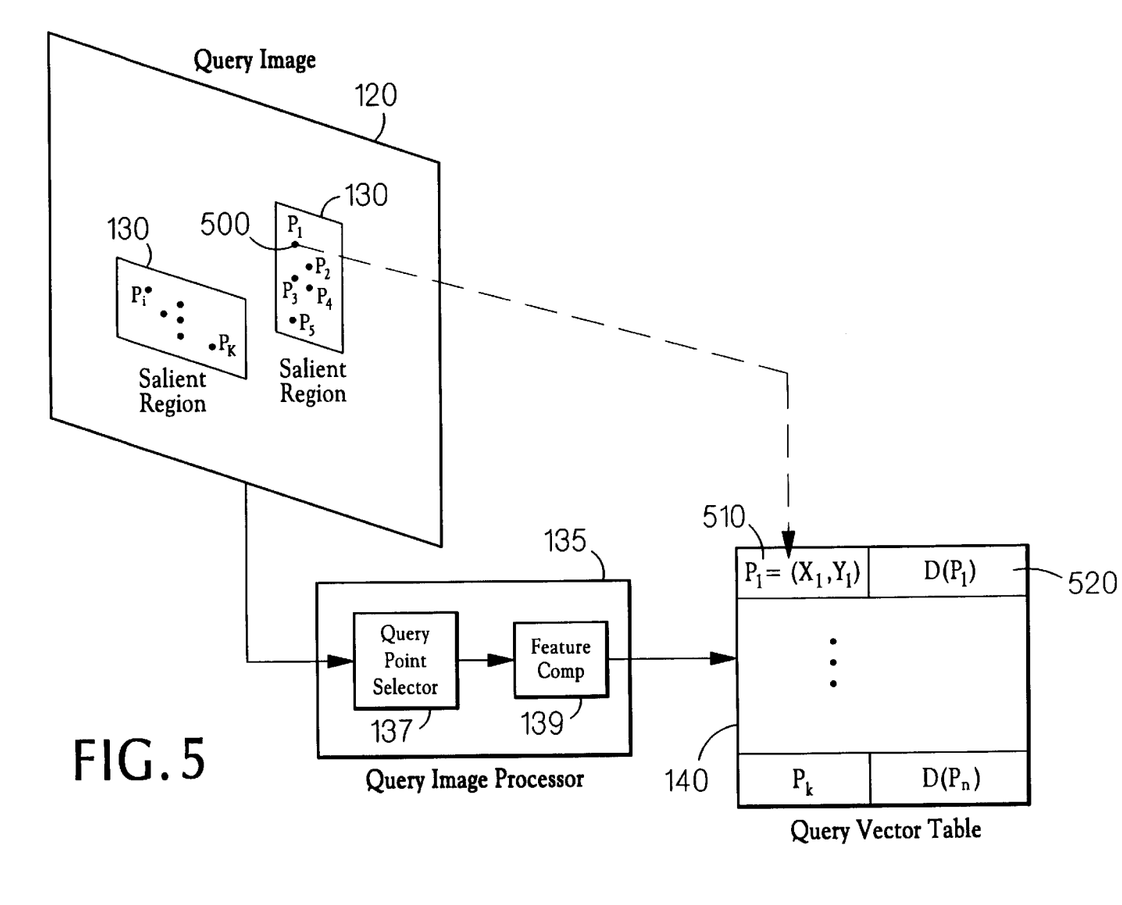
FIG. 5 illustrates a procedure for constructing a query vector table from multiple query points in user selected salient regions in a query image.

FIG. 5 shows query image processor 135 used to constructing query vector table 140 from user selected query image 120. In addition to selecting the query image, the user also selects salient regions 130 within the image. Query points selector 137 selects points automatically within these salient regions. Query vector table 140 is filled by the query image processor such that each row corresponds to one of the selected points and includes a field with the two coordinate values of the point, and a second field containing the 12 values of the feature vector computed by feature computation using the procedure in multiscale invariant feature computation 210. The sampled points in the query image are chosen by query point selector 137 such that the points are:

(1) within the selected salient regions,
(2) on a regular grid such as that used in constructing the database vector table, and
(3) in a subset of points on the grid, chosen for example, by selecting grid points at which the value of the gradient magnitude squared at that point (computed as the invariant feature $d_{1;\sigma 2}(p)$) is greater than 0.8 times the mean value of the gradient magnitude squared at points on the grid within that region.

The data in query vector table 140 is the complete representation of the query for retrieval. The original query image is not accessed in subsequent stages of scoring.

Figure 6:
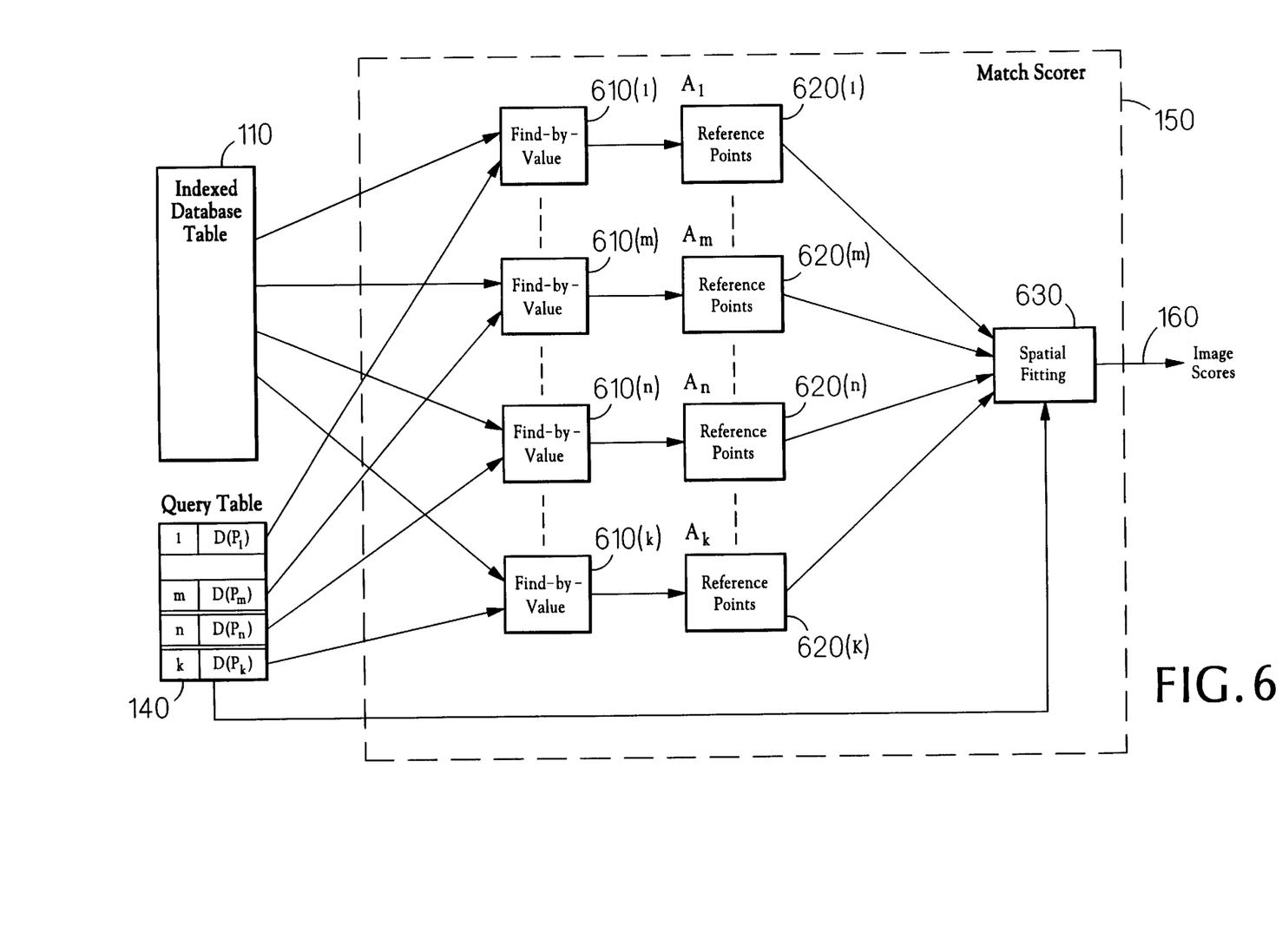
FIG. 6 illustrates a procedure for scoring database images relative to a query.

Referring to FIG. 6, match scorer 150 uses indexed database table 110 and query vector table 140 to compute match scores 160, i.e., one scalar score for each database image. As illustrated, query vector table 140 has K rows corresponding to K query points selected by query point selector 137. For each of the K rows of the query vector table, a set of similar database points from database vector table 112 is found. A set of database points $A_m$ 620(m) is associated with the $m^{th}$ query point $p_m$ and is composed of rows of the database vector table for which the invariant feature vectors are similar to $D(p_m)$. Specifically, find-by-value module 610(m) takes the vector $D(p_m)$ and finds the subset of rows in database vector table 112 which satisfy $D_k(p_{ij}) - D_k(p_m) < t_k$ for all dimensions k. $D_k(p_{ij})$ is the $k^{th}$ dimension of the feature vector in the database row for a point $p_{ij}$ of a database image, $D_k(P_m)$ is the $k^{th}$ dimension of the query feature vector and $t_k$ is the $k^{th}$ dimension of a fixed tolerance vector t. This tolerance, or threshold, vector limits the number of points chosen. The sets of database points 620(1)–620(K) corresponding to the K query points in query vector table 140 are the inputs to a spatial fitting module 630 which determines image scores 160 for the database images.

Figure 7:
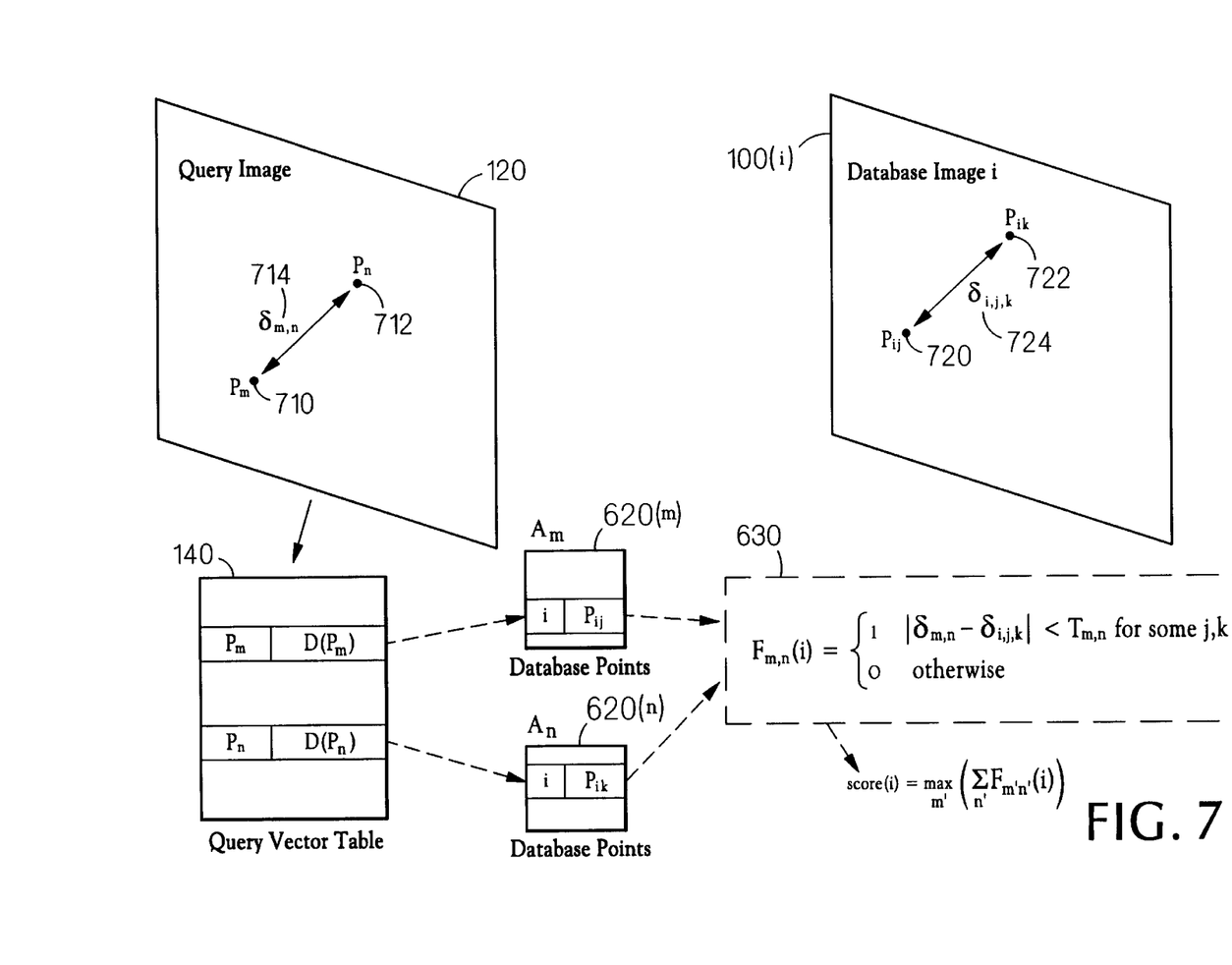
FIG. 7 illustrates a procedure for spatial matching query points and database points and for computing a matching score for a database image.

FIG. 7 illustrates the procedure used in spatial fitting module 630. Two representative database point sets $A_m$ 620(m) and $A_n$ 620(n) corresponding to query points $p_m$ 710 and $p_n$ 712 in query image 120 are shown. These query points are separated in the query image by Euclidean distance $\delta_{mn}$ 714. A representative database image 100(i) is shown with representative database points $p_{ij}$ 720 and $p_{ik}$ 722 separated by Euclidean distance $\delta_{ijk}$ 724. A representative computation for the two query points and pairs of database points evaluated in spatial fitting module 630 is shown. Specifically, $F_{mn}(k)=1$ if there is some pair of points $p_{ij}$ and $p_{ik}$ in database image i such that the separation of query points $p_m$ and $p_n$, $\delta_{mn}$, differs from the separation of $p_{ij}$ and $p_{ik}$, $\delta_{ijk}$, by no more than $T_{mn}$. $T_{mn}$ is in general a function of $\delta_{mn}$; for example, $T_{mn}=0.25\delta_{mn}$. The choice of $T_{mn}$ may also depend on characteristics of the images in the indexed database table. If no such pair of database points in database image i exits, $F_{mn}(i)=0$. Match scorer 150 computes the score for database image i as score $(i)=\max_{m'}(\Sigma_{n'} F_{m'n'}(i))$ which can be interpreted as the greatest number of matched pairs of points in database image i, all associated with a particular query point.

Figure 8:
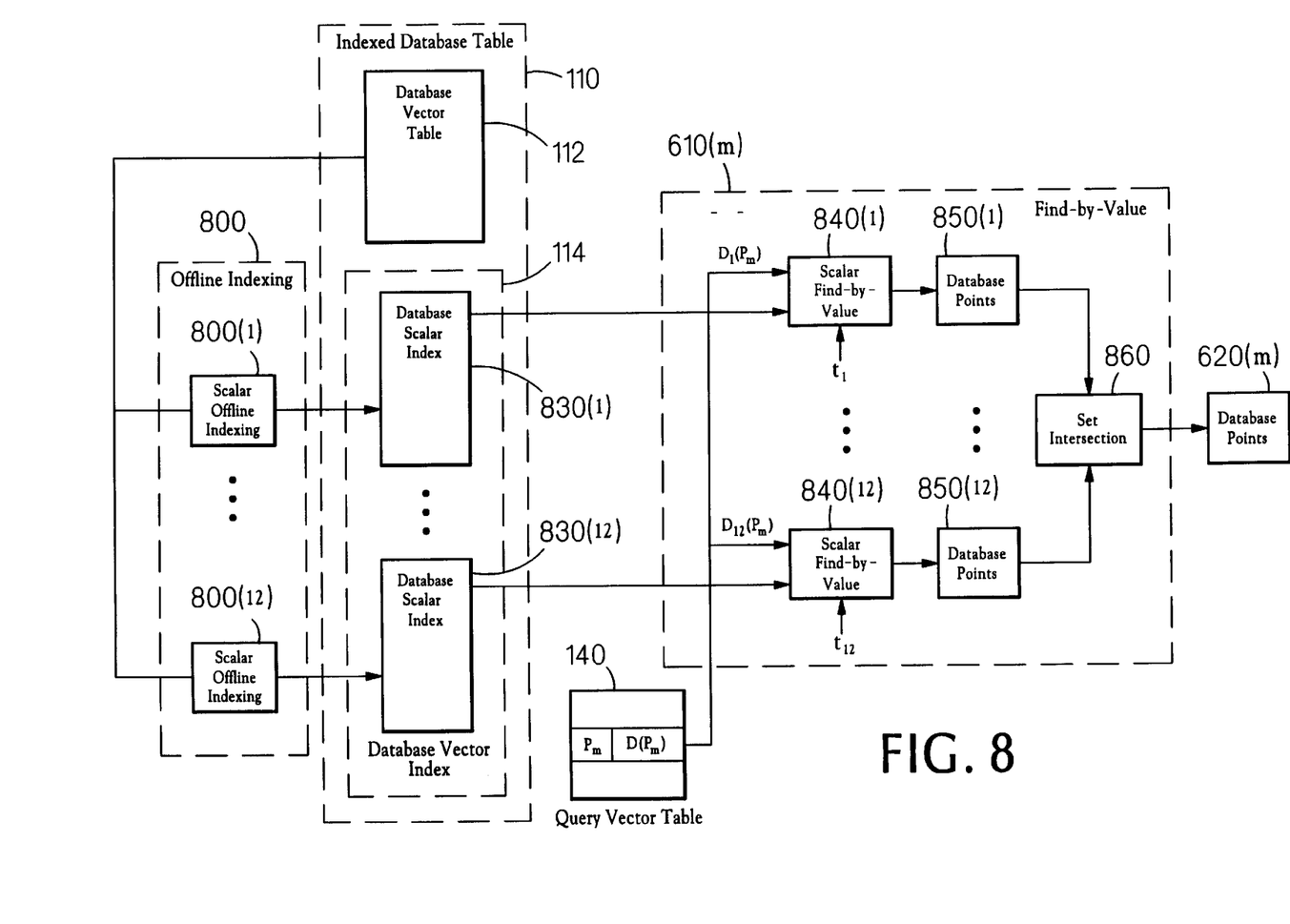
FIG. 8 illustrates an approach to constructing and accessing a database vector index.

FIG. 8 shows the details of the on-line and off-line components of a representative find-by-value module 610 (m). Off-line, before a user specifies a query, database vector table 112 is indexed in off-line indexing element 800 to reduce the on-line computation required to create a find-by-value table $A_m$ associated with query point $p_m$. Database vector index 114 includes separate indices 830(1)–830(12) for the 12 dimensions of the invariant feature vectors. Find-by-value element 610(m) performs separate computations for each dimension of the feature vector and then combines the results to form the set $A_m$ 620(m). Considering the find-by-value step using $D_1(p_m)$, the first dimension of $D(p_m)$, scalar find-by-value element 840(1) accepts $D_1(p_m)$ and a scalar tolerance $t_1$ as input along with database scalar index 830(1) and produces a table of database points 850(1) as output. Each row of table 850(1) contains a database image index and the coordinates of a database point in that image. A row containing an image index i and coordinates $p_{ij}$ is included in the table if the first dimension $D_1(p_{ij})$ of the corresponding feature vector $D(p_{ij})$ found in database vector table 112 satisfies $D_1(p_{ij})-D_1(p_m)<t_1$. Scalar find-by-value elements 840(2)–840(12) compute tables 850(2)–850(12) similarly for the remaining dimensions. Set intersection element 860 retains the rows present in all the tables to produce $A_m$ 620(m).

Figure 9:
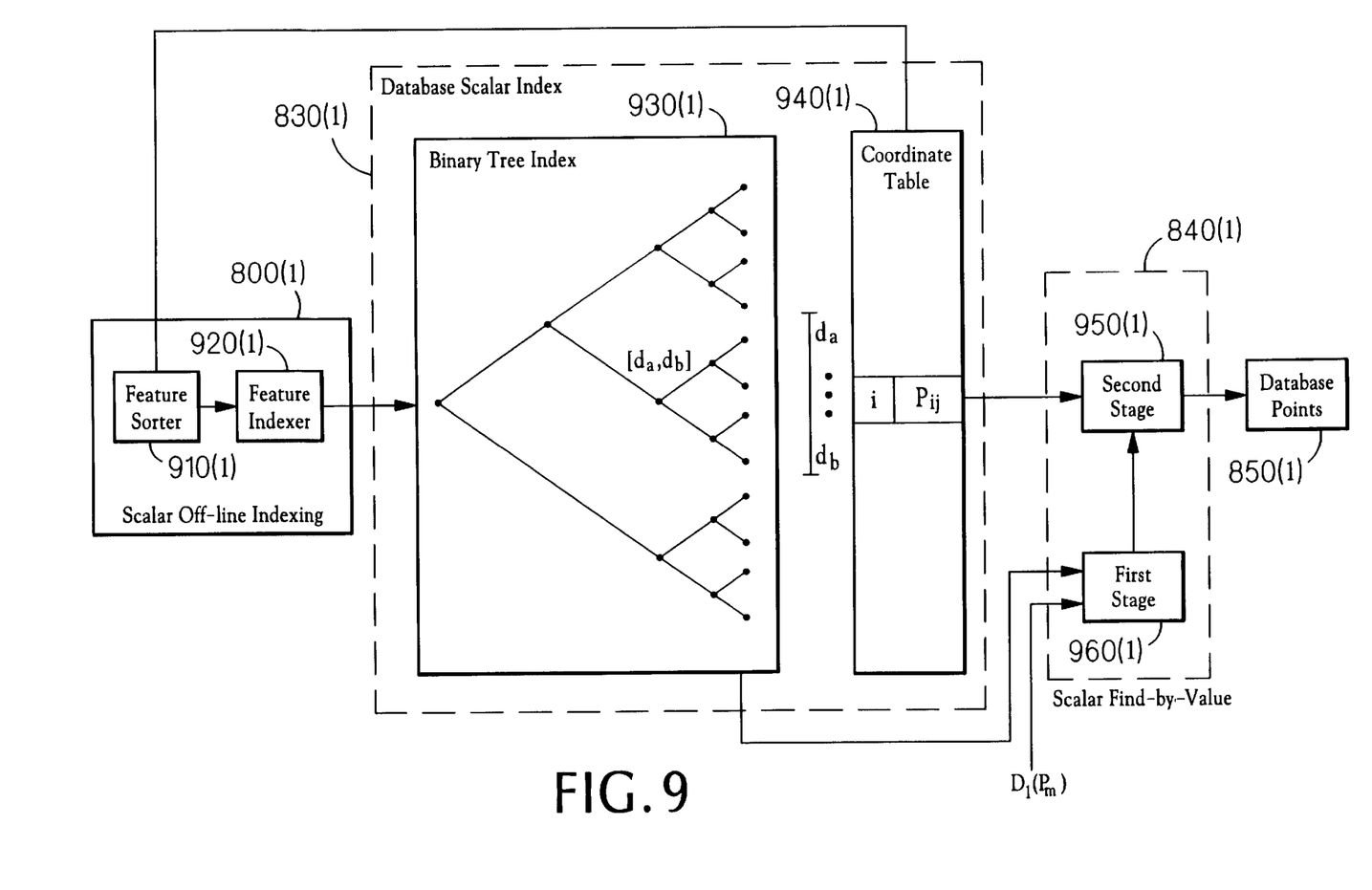
FIG. 9 illustrates the detailed approach to construct and access a database vector index for one dimension of a vector representation.

Off-line indexing 800(1) produces database scalar index 830(1) for the first dimension of the feature vector. FIG. 9 illustrates the procedure for performing off-line indexing 800(1) as well as on-line scalar find-by-value element 840 (1). Indexing involves two steps. First, feature sorter 910(1) sorts the rows of database vector table 112 by the value of the first dimension of the feature vector and stores corresponding image index and coordinate values in coordinate table 940(1). A feature indexer 920(1) uses the corresponding feature values to the coordinate table to construct a binary tree index 930(1). The leaves correspond to the rows of coordinate table 940(1) and are annotated with the corresponding feature value. The nodes of the tree are annotated with the range of feature values (that is, the minimum and maximum values) in the subtree below the node.

On-line scalar find-by-value element 840(1) involves a first stage 960(1) that determines the range of rows of the coordinate table to use, and a second stage 950(1) which transfers those rows of the coordinated table to the output 850(1). First stage 960(1) takes the query feature value $D_1(p_m)$ and the tolerance $t_1$ and makes two passes through the binary tree to determine the first row, $R_1$, that satisfies $D_1(p_{ij})>D_1(p_m)-t_1$ and the last row, $R_2$, that satisfies $D_1(p_{ij})<D_1(p_m)+t_1$. If $R_1 \leq R_2$, then the range of rows $[R_1, R_2]$ is passed to the second stage 950(1). Otherwise, no rows are within the tolerance and a null range is passed to the second stage producing an empty table 850(1).

The invention is not limited to the embodiments described herein. For example, an automated means of selecting salient query regions could be used instead of requiring the user to select them. The ordered set of the scored database images can be further processed in some way before being presented to the user, for example, by retaining only the best matching images. Other off-line preprocessing of the database vector table could be performed, rather than constructing binary tree indices in order to reduce on-line computation involved in match scoring. Other techniques for sampling points in database and query images could be used instead of sampling on a regular grid. For example, the sampled points could be chosen based on the image content. There are also several other choices used for the particular vector representation. For example, various alternative methods of computing a set of features, each responsive to different spatial frequencies or each determined from different sized neighborhoods around the sampled points are well known to those skilled in the art of image processing.

Figure 10:
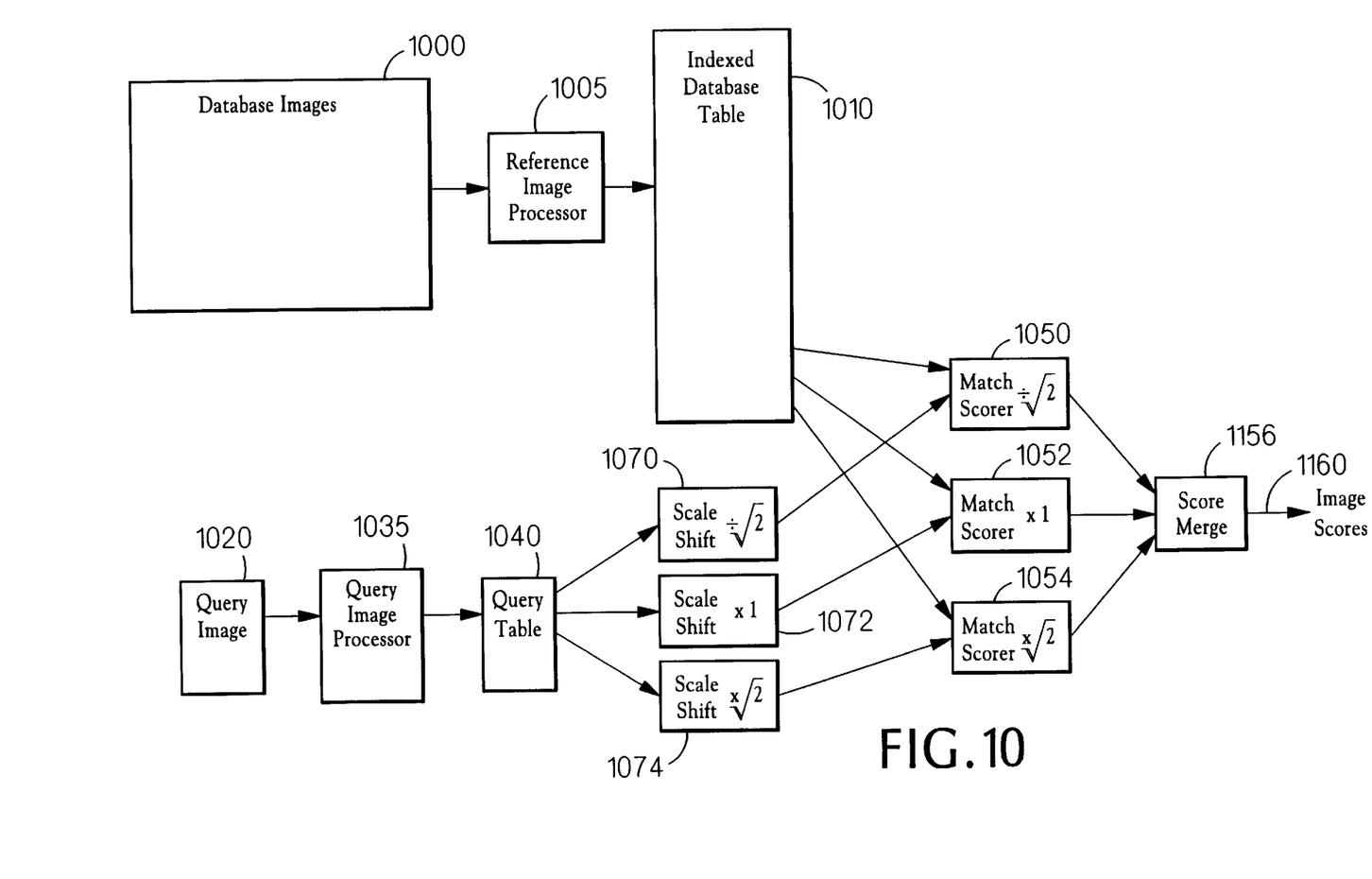
FIG. 10 illustrates an image indexing and retrieval procedure including scale shifting of a query image.

Another embodiment addresses the case in which there is a difference in scale (i.e., object size) between a query image and a database image containing the desired object. The procedure described above is modified as follows. Rather than computing a features at three spatial scales for the query image, features at additional spatial scales are computed for the query image. Referring to FIG. 10, database images 1000 are processed by database image processor 1005 using the three-scale procedure of the previously described embodiment. Query image 1020 is processed by query image processor 1035 which computes feature vectors at two additional scales with parameters $\sigma 0 = \sigma 1/\sqrt{2}$ and $\sigma 4 = \sigma 3\sqrt{2}$, producing query vector table 1040.

Match scorers 1050, 1052, and 1054 perform the identical function as match scorer 150 shown in FIG. 1. That is, these match scorers compare feature vectors which are made up of components from three spatial scales. As query vector table 1040 includes feature vectors which are made up of five spatial scales, scale shifters 1070, 1072, and 1074 are used to create the needed inputs to match scorers 1050, 1052, and 1054. In particular, scale shifter 1070 selects the components of feature vectors with scale parameters $\sigma 0$, $\sigma 1$, and $\sigma 2$; scale shifter 1072 selects $\sigma 1$, $\sigma 2$, and $\sigma 3$; and scale shifter 1074 selects $\sigma 2$, $\sigma 3$, and $\sigma 4$. In order to properly spatially fit, scale shifter 1070 multiplies coordinate values by $\sqrt{2}$; scale shifter 1072 leaves coordinate values unchanged; and scale shifter 1074 divides coordinate values by $\sqrt{2}$. The outputs of the match scorers are combined in score merger 1156 to retain the score from the best matching scale shift to produce image scores 1160 for database images.

Figure 11:
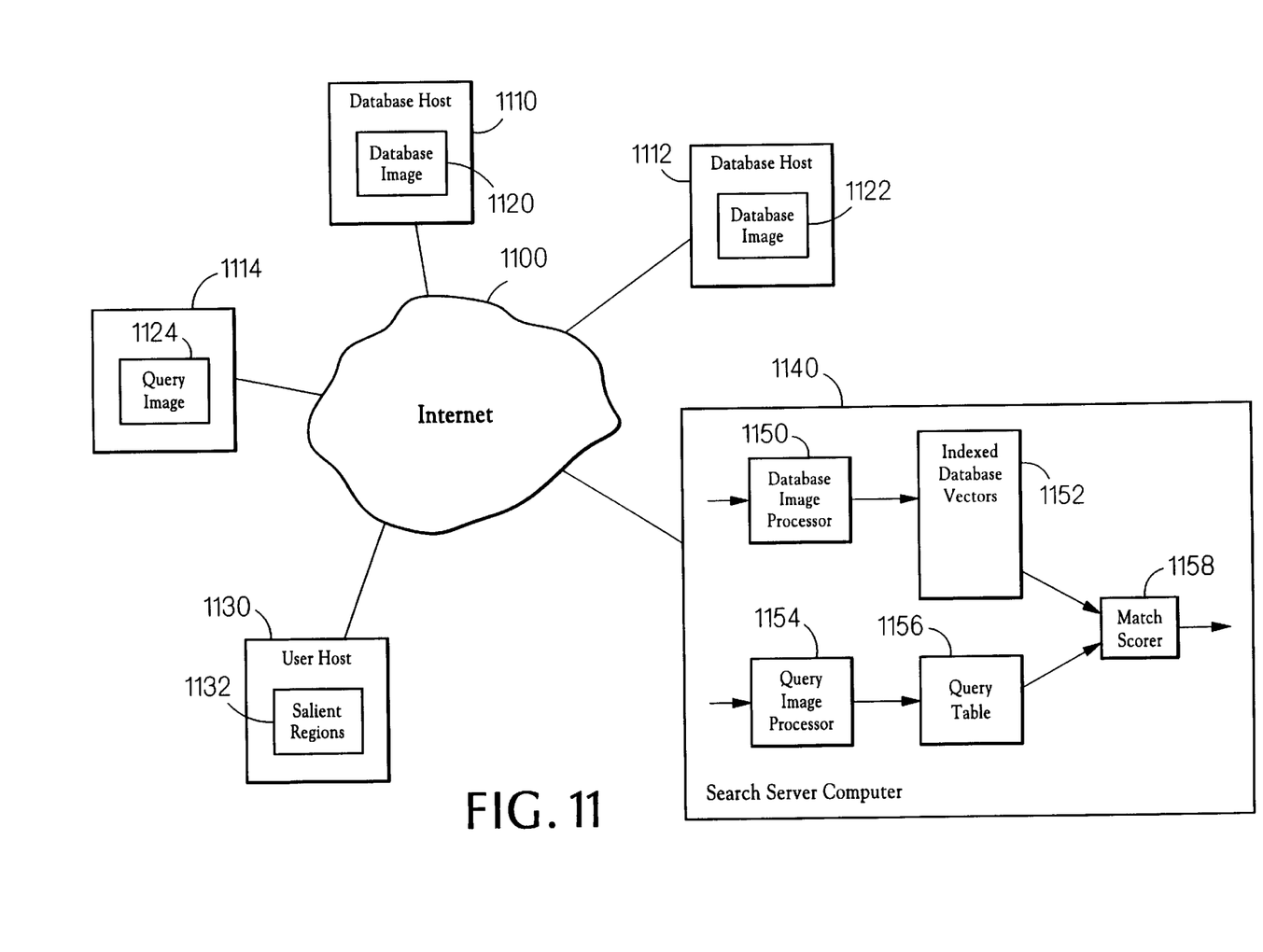
FIG. 11 shows an embodiment of the invention used to index images accessible over the Internet.

Embodiments of this invention can be used to index large numbers of images. As illustrated in FIG. 11, database images, such as images 1120, 1122 on database hosts 1110, 1112, are accessible over the Internet 1100 using hyperlinks that are part of the World Wide Web. Such database images are indexed using this embodiment in much the same manner that text data is indexed today.

Database images are located on the Internet by following links (references) in Web documents searching for links to images. These images are processed in database image processor 1150 to construct indexed database vectors 1152 stored at a search server computer 1140. When a user at a user host 1130 wants to make a query, he specifies a query image to the search server. The query image 1124 may be on yet another host 1114 on the Internet. The user also specifies the salient regions 1132 which he also communicates to the search server. Query image processor 1154 accepts the query image and the specification of salient regions and constructs query vector table 1156. Match scorer 1158 computes scores for database images that may satisfy the user's query. Links to those database images are sent to user host 1130. The database images are then transferred across the Internet to the user host for viewing by the user.

Figure 12:
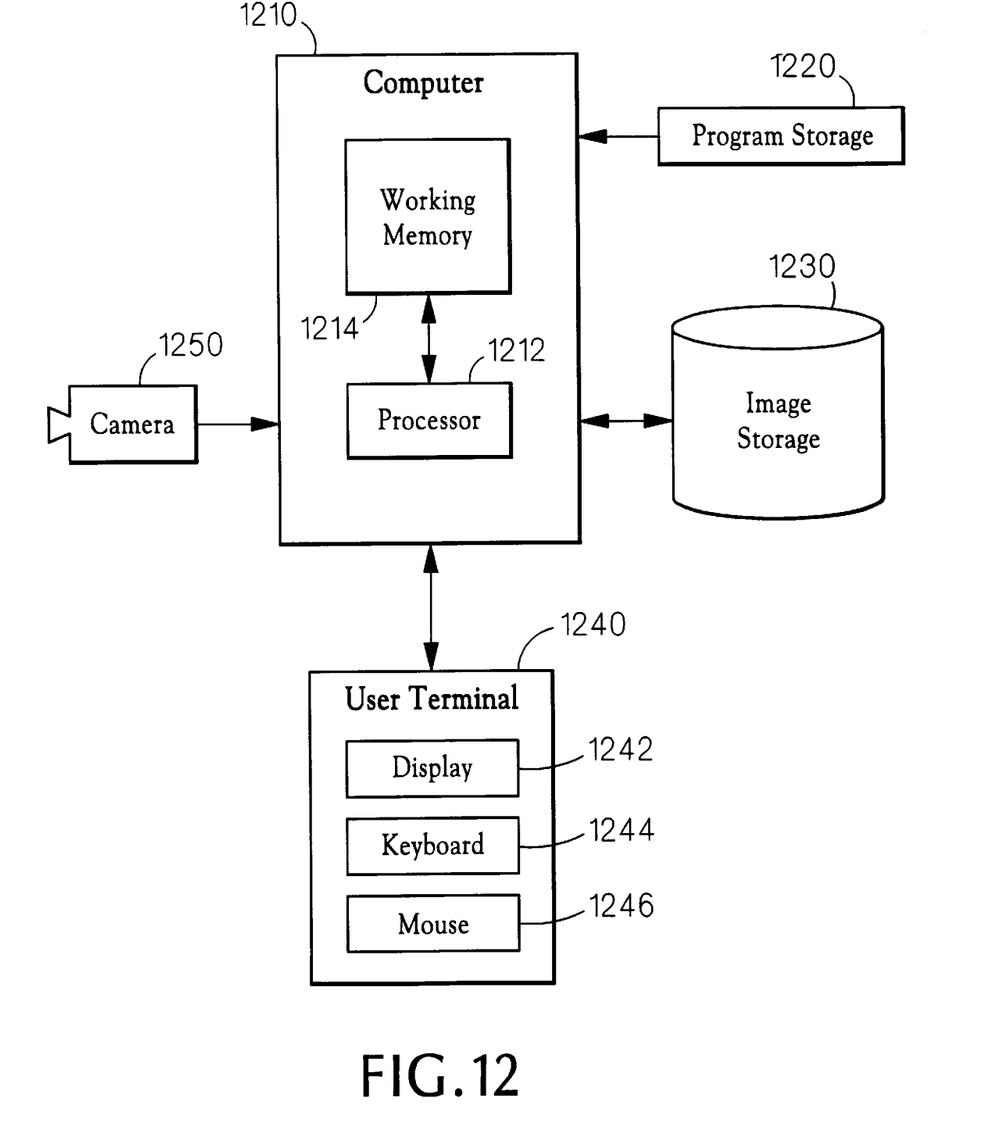
FIG. 12 shows a computer used to execute a computer program implementing an image retrieval procedure.

The image retrieval approach described above can be implemented in any of a variety of way, including using a general purpose computer 1210, as shown in FIG. 12. Computer 1210 includes a processor 1212 and a working memory 1214. Image processors, such as database image processor 105 and query image processor 135, as well as other computation elements, are implemented as software modules or programs containing instructions which are stored in working memory 1214 and executed on processor 1212. The software modules or programs are provided to computer 1210 from an external program storage 1220, such as a magnetic disk, or some other non-volatile storage, or over a computer network. Database images 100 are stored in an image storage 1230, such as a magnetic disk, or other non-volatile storage, accessible from computer 1210. Image storage 1230 also includes derived data obtained by processing database images 100, such as indexed database vectors 110. Such derived data can also be stored separately from the database images, for example on a different disk drive. A query image may be previously recorded and stored, or may be provided by camera 1250 to computer 1210. A user interacts with computer 1210 using a user terminal 1240. The user terminal 1240 includes a display 1242, a keyboard 1244, and a mouse 1246. The mouse 1246 is used, for example, to select a salient region of a query image rendered on display 1242. Display 1242 is also used to present retrieved database images to the user.

Another embodiment involves indexing a large number of images in a database, for example, images stored on a CD-ROM optical disk. The approach described above is the used to identify images containing an object of interest on the CD-ROM. Yet another embodiment may be used to index a large number of images or printed or handwritten text. The query image is determined using an additional stage of specifying a text string to search for and creating the query image from the text string. The procedure can then retrieve documents containing the desired text without requiring that the documents be converted from image to text form using an optical character recognition procedure.

What is claimed is:

1. A method of image retrieval comprising:
   applying a database multiscale image processing procedure to each of a plurality of database images producing a plurality of database multiscale vectors, wherein each multiscale vector characterizes a region about a different one of a corresponding plurality of points in the images;
   indexing the database vectors to produce a database vector index;
   applying a query multiscale image processing procedure to a query image to produce a plurality of query multiscale vectors, wherein each query multiscale vector characterizes a region about a different one of a corresponding plurality of points in the query image; and
   matching the plurality of query vectors with the plurality of indexed database vectors to identify a database image which is similar to the query image;
   wherein each of the database multiscale vectors and the query multiscale vectors includes a plurality of single scale vectors associated with a corresponding plurality of database spatial scales.

2. The method of claim 1 wherein the database image processing procedure and the query multiscale image processing procedure applied to an image each includes:
   applying a single scale image processing procedure to the image at each of the plurality of database spatial scales to a produce a plurality of single scale vectors; and
   combining single scale vectors each associated with a same point in the image to form a multiscale vector associated with that same point.

3. The method of claim 2 wherein the single scale image processing procedure applied to the image includes:
   evaluating a plurality of smoothed spatial derivatives of image intensity at a point in the image; and
   transforming the plurality of spatial derivatives to produce a single scale vector associated with the point such that the single scale vector is insensitive to rotation of the image about the point.

4. The method of claim 3 wherein evaluating the smoothed spatial derivatives of image intensity includes the step of filtering the image using a derivative of a Gaussian function.

5. The method of claim 1 further comprising:
   accepting a specification of a salient region of the query image; and
   selecting the plurality of query points within the salient region.

6. The method of claim 1 wherein matching further includes the step of comparing relative location of points associated with query vectors with relative locations of points associated with database vectors.

7. The method of claim 1 wherein each of the query vectors further includes a plurality of single scale vectors associated with a corresponding plurality of additional spatial scales, and matching includes the step of selecting a subset of the single scale vectors in each of the query vectors.

8. The method of claim 1 wherein matching further includes accessing the database vector index to find database vectors that have similar values to one of the query vectors.

9. The method of claim 1 wherein the single scale vectors included in each of the database multiscale vectors and the query multiscale vectors characterize regions about a same point in an image as that multiscale vector.

10. A computer program stored on a computer readable medium for causing a computer to perform the functions of:
    applying a database multiscale image processing procedure to each of a plurality of database images producing a plurality of database multiscale vectors, wherein each multiscale vector characterizes a region about a different one of a corresponding plurality of points in the images;
    indexing the database vectors to produce a database vector index;
    applying a query multiscale image processing procedure to a query image to produce a plurality of query multiscale vectors, wherein each query multiscale vector characterizes a region about a different one of a corresponding plurality of points in the query image; and
    matching the plurality of query vectors with the plurality of indexed database vectors to identify a database image which is similar to the query image;

wherein each of the database multiscale vectors and the query multiscale vectors includes a plurality of single scale vectors associated with a corresponding plurality of database spatial scales.

11. The computer program of claim 10 wherein the database image processing procedure and the query multiscale image processing procedure applied to an image each includes:

applying a single scale image processing procedure to the image at each of the plurality of database spatial scales to a produce a plurality of single scale vectors; and combining single scale vectors each associate with a same point in the image to form a multiscale vector associated with that same point.

12. The computer program of claim 10 wherein the single scale image processing procedure applied to the image includes:

evaluating a plurality of smoothed spatial derivatives of image intensity at a point in the image; and transforming the plurality of spatial derivatives to produce a single scale vector associated with the point such that the single scale vector is insensitive to rotation of the image about the point.

13. The computer program of claim 12 wherein evaluating the smoothed spatial derivatives of image intensity includes the step of filtering the image using a derivative of a Gaussian function.

14. The computer program of claim 10 for further causing the computer to perform the functions of:

accepting a specification of a salient region of the query image; and selecting the plurality of query points within the salient region.

15. The computer program of claim 10 wherein the function of matching further includes the step of comparing relative location of points associated with query vectors with relative locations of points associated with database vectors.

16. The computer program of claim 10 wherein each of the query vectors further includes a plurality of single scale vectors associated with a corresponding plurality of additional spatial scales, and the function of matching includes selecting a subset of the single scale vectors in each of the query vectors.

17. The computer program of claim 10 wherein the function of matching further includes accessing the database vector index to find database vectors that have similar values to one of the query vectors.

18. The computer program of claim 10 wherein the single scale vectors included in each of the database multiscale vectors and the query multiscale vectors characterize regions about a same point in an image as that multiscale vector.

19. An image retrieval system for comparing a query image to a plurality of database images comprising:

a database image processor;

a plurality of database multiscale vectors produced by applying each of the plurality of database images as input to the database image processor;

a database vector index for accessing the database vectors;

a query image processor;

a plurality of query multiscale vectors produced by applying the query image as input the query image processor; and means for matching the plurality of query vectors with the indexed database vectors to identify a database image which is similar to the query image;

wherein each of the database multiscale vectors and the query multiscale vectors includes a plurality of single scale vectors associated with a corresponding plurality of database spatial scales.

20. The system of claim 19 wherein the database image processor and the query image processor each includes:

a derivative processor used to compute a plurality of smoothed spatial derivatives of an input image for each of the database spatial scales; and a feature processor which takes the plurality of derivatives and whose output is insensitive to rotation of the input image around a point.

21. The system of claim 19 wherein the query image processor includes a means for accepting a specification of a salient region of the query image, and the database vectors are associated with points within the salient region.

22. The system of claim 19 wherein the means for matching further includes a spatial matcher that compares relative locations of query points and relative locations of database points.

23. The system of claim 19 wherein each of the query vectors further includes a plurality of single scale vectors associated with a corresponding plurality of additional spatial scales, and the means for matching includes a means for selecting a subset of the single scale vectors in each of the query vectors.

24. The image retrieval system of claim 19 wherein the single scale vectors included in each of the database multiscale vectors and the query multiscale vectors characterize regions about a same point in an image as that multiscale vector.

* * * * *